Jan. 2, 1968 — G. R. LESTER — 3,361,839

DEHYDROGENATION PROCESS

Filed Oct. 28, 1964

INVENTOR:
George R. Lester

BY: James R. Hootson Jr.
William H. Page II
ATTORNEYS

United States Patent Office 3,361,839
Patented Jan. 2, 1968

3,361,839
DEHYDROGENATION PROCESS
George R. Lester, Mount Prospect, Ill., assignor to Universal Oil Products Company, Des Plaines, Ill., a corporation of Delaware
Filed Oct. 28, 1964, Ser. No. 407,451
8 Claims. (Cl. 260—669)

ABSTRACT OF THE DISCLOSURE

A hydrocarbon is subjected to dehydrogenation in contact with one side of an oxygen transfer zone comprising an oxygen transfer agent, such as Cr, Mo, Fe or oxides thereof, disposed in a porous structure providing essentially diffusion controlled fluid transport therethrough. An oxygen-containing gas is maintained in contact with the other side of the transfer zone. Oxygen is diffused into the transfer zone to oxidize the transfer agent. Simultaneously, free hydrogen liberated during the course of the dehydrogenation diffuses into the transfer zone in the opposite direction, undergoing oxidation and reducing the transfer agent. The selective conversion of hydrogen permits the dehydrogenation reaction to proceed at a relatively low temperature and with high selectivity toward the desired less saturated hydrocarbon product.

The process is effected in a concentric tube reactor, the inner tube being modified to provide the oxygen transfer zone which may take the form of a plurality of spaced apertures filled with particulated transfer agent or, alternatively, the inner tube may be formed of a porous monolithic material, such as "thirsty" glass, impregnated with the oxygen transfer agent.

---

This invention relates to an improved process for the dehydrogenation of hydrocarbons and to a reactor for carrying out the process. More particularly, the invention is directed to a method and means for reducing the hydrogen activity of the dehydrogenation equilibrium mixture whereby to increase the olefin:feed equilibrium ratio of the product. This technique permits the use of substantially lower dehydrogenation temperatures than are conventionally employed and achieves greater yields per pass and higher selectivity.

Briefly stated, the reduction of hydrogen activity is accomplished through use of a solid chemical oxygen transfer agent disposed as a confined bed of finely divided contact material, or supported on a porous monolithic structure, having one end or side in open fluid communication with the dehydrogenation zone and the other end or side in open fluid communication with a free oxygen-containing atmosphere. The oxygen transfer agent is maintained at substantially dehydrogenation temperature and comprises a metal or metal oxide which is reducible by hydrogen to a lower oxide or metal at dehydrogenation temperature and conversely is oxidizable to the original higher oxide at the same temperature. Materials fulfilling these requirements, especially at the relatively low dehydrogenation temperatures obtainable by the invention, are chromium, molybdenum, iron and the oxides thereof such as $Cr_2O_3$, $MoO_2$, $MoO_3$, $Se_2O_3$ and $Fe_3O_4$. Oxygen is allowed to contact the oxygen transfer agent, thereby oxidizing the metallic constituent of the oxygen transfer agent to a higher oxide. At the same time the free hydrogen liberated in the dehydrogenation zone penetrates the oxygen transfer agent from the reverse direction, thereby reducing the metallic constituent of the oxygen transfer agent to a lower oxide or free metal, and converting the hydrogen to water or steam. The much higher mobility of hydrogen in comparison with the hydrocarbon components of the equilibrium mixture, as well as its higher reactivity with the oxygen transfer agent, assures its selective removal with little or no loss of feed or product hydrocarbons by oxidation. This selective removal of hydrogen from the dehydrogenation equilibrium mixture causes further dehydrogenation whereby to increase the conversion per pass. As water and the metal or lower metal oxide are formed from reaction of the hydrogen with the oxide, a gradient of oxygen is established across the oxygen transfer zone, and the oxide is reformed by oxygen passing through the oxide in a "bucket-brigade" manner. The net result is the continuous regeneration of the oxygen transfer agent and the continuous chemical consumption of hydrogen in the dehydrogenation equilibrium mixture.

The process of this invention may be advantageously practiced by use of a novel tubular reactor comprising inner and outer tubes, at least a portion of the wall of the inner tube defining a porous structure extending transversely therethrough and providing diffusive fluid communication from the interior of the inner tube to the outer space between said tubes, said structure comprising an oxygen transfer agent selected from the group consisting of chromium, molybdenum, iron and the oxides of these metals. The reactor further includes means for heating said tubes to dehydrogenation temperature, means for introducing gaseous hydrocarbon feed into one of the tubes and for withdrawing product therefrom, and means for introducing an oxygen-containing gas into the other of said tubes. In one specific embodiment of the invention, the porous structure is provided by a plurality of axially spaced, or axially and circumferentially spaced, apertures extending through the wall of the inner tube, each aperture being filled with a confined particle-form or finely divided bed of suitable oxygen transfer agent. In another embodiment of the invention, the porous structure is provided by constructing the inner tube of a porous refractory or monolithic material, such as a highly porous glass, unglazed ceramic, or a sintered or sponge metal matrix, and filling the pores of such refractory material with the oxygen transfer agent in a manner similar to the preparation of refractory supported catalysts. In either construction the interior of the inner tube may be the dehydrogenation zone and the annular space between the tubes may be the oxygen supply zone; conversely, the interior of the inner tube may be the oxygen supply zone and the annular space between the tubes may be the dehydrogenation zone.

The dehydrogenation may be carried out thermally or catalytically, preferably the latter. For thermal conversion, the dehydrogenation zone may either be left empty or else filled with inert heat retentive packing or heat transfer pebbles. For catalytic conversion the catalyst may be suitably deposited as a thin film upon the wall of the dehydrogenation zone, as by vapor deposition or impregnation techniques; alternatively, the dehydrogenation zone may comprise a bed of catalyst particles. The various dehydrogenation catalysts suitable for use in the instant invention are well known in the art and they include, for example, alumina, chromia-alumina, chromia-magnesia, chromia-beryllia-alumina, ferria-alumina, ferria-magnesia; Group VIII metals and metal oxides in general, particularly platinum-alumina and nickel oxide-alumina; oxides of strontium, barium and molybdenum; orthophosphoric acid; various alkali or alkaline earth metals or cupric oxide plus a stabilizer such as an oxide of silver, zinc, cadmium, cobalt or nickel. Typical specific compositions include, for example, 3–60% chromia on alumina, 10–20% $Fe_2O_3$ on alumina, 40 chromia-10 beryllia-50 alumina, with any of the foregoing being promoted by the addition of 1–8% potassia or cupric oxide. Another well known catalytic composition for dehydrogenation reactions is 10–30% $Fe_2O_3$ plus 3–8% $K_2O$ plus 62–87% CuO. The particular composition of a given catalyst as it may be employed in the present invention will, of course, be determined in accordance with the particular feed stock, reaction conditions and extent of conversion desired, in a manner known to those skilled in the art.

The apparatus and process of this invention are generally applicable in the dehydrogenation of paraffins, olefins and alkyl aromatics and more particularly in the dehydrogenation of n-alkanes or iso-alkanes containing 3 to 18 carbon atoms per molecule to the corresponding n-alkenes or iso-alkenes or, in a single stage, to the corresponding n-alkadienes or iso-alkadienes; further, in the dehydrogenation of n-alkenes or iso-alkenes containing 3 to 6 carbon atoms per molecule to the corresponding n-alkadiene or iso-alkadiene, particularly the conjugated dienes; still further, in the dehydrogenation of an alkylbenzene or alkylnaphthalene, wherein the alkyl group contains 2 to 6 carbon atoms, to the alkylenebenzene or alkylenenaphthalene. Some of the more commercially important conversions include, for example, the dehydrogenation of propane to propylene, n-butane to 1-butene, n-butane to 1,3-butadiene, 1-butene to 1,3-butadiene, cis-2-butene or trans-2-butene to 1,3-butadiene, 1-pentene to 1,3-pentadiene, 2-methyl-1-butene to isoprene, dodecane to various dodecenes, ethylbenzene to styrene, isopropylbenzene to methylstyrene, and ethylnaphthalene to vinylnaphthalene.

Whereas catalytic dehydrogenation processes of the prior art require relatively high temperatures to achieve commercially significant conversions (e.g., 950°–1100° F. for butane dehydrogenation), the present invention affords substantial conversions at much lower temperatures, for example, in the range of 200°–750° F. when a catalyst is employed. Feed partial pressures may range from a few millimeters Hg absolute to 50 p.s.i.a. or more, and space velocities from 0.3 to 10,000 volumes of hydrocarbon feed/volume of catalyst/hr.

It is, therefore, a further embodiment of the invention to provide an improved process for the dehydrogenation of a hydrocarbon feed wherein the feed is reacted in a dehydrogenation zone under dehydrogenation conditions to yield less saturated hydrocarbon and free hydrogen, which improvement is specifically directed to reducing the hydrogen activity of the reaction mixture and which comprises providing an oxygen transfer zone having two spaced open ends in fluid communication respectively with the dehydrogenation zone and an oxygen supply zone, said transfer zone comprising a chemical oxygen transfer agent selected from the group consisting of chromium, molybdenum, iron and the oxides of these metals, maintaining said transfer zone substantially at the temperature of said dehydrogenation zone, flowing oxygen from said supply zone into one end of said transfer zone and oxidizing said transfer agent, simultaneously flowing said hydrogen into the other end of said transfer zone and reducing said transfer agent and converting the hydrogen to $H_2O$, thereby establishing an oxygen concentration gradient across said transfer zone, which concentration decreases in the direction of the dehydrogenation zone.

The present invention may be more clearly understood by reference to the accompanying drawing, which illustrates the preferred mode of implementing the invention but is not intended to delimit the scope thereof to any greater extent than is required by the claims and in which:

Figure 1:
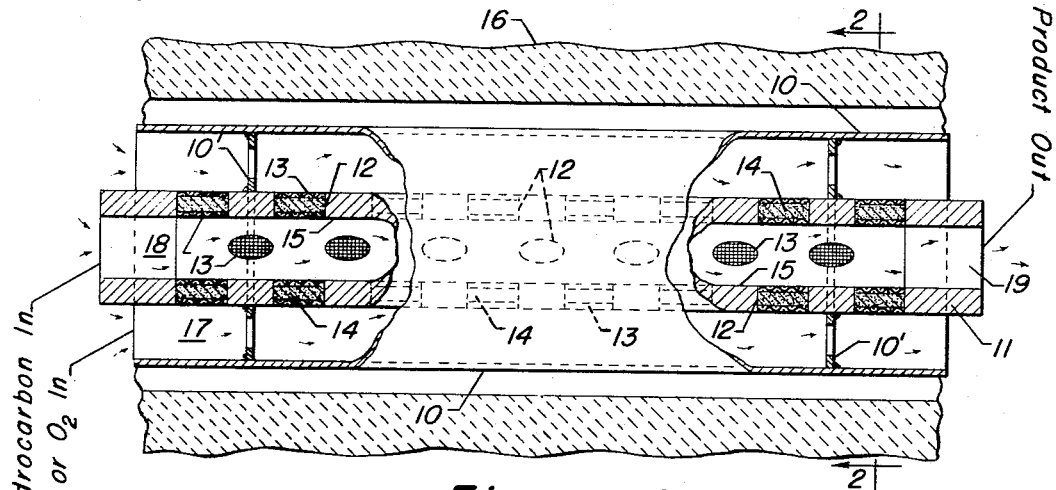
FIGURE 1 is a sectional view of a tubular reactor wherein the oxygen transfer agent is arranged in a plurality of spaced apertures in the wall of the inner tube.
Figure 2:
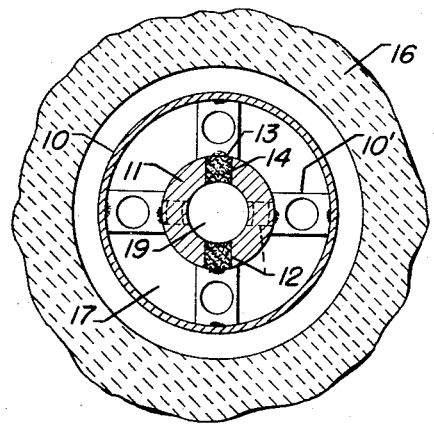
FIGURE 2 is a transverse view of the apparatus of FIGURE 1, taken along line 2—2 of FIGURE 1.

With reference to FIGURES 1 and 2, the reactor is comprised of an outer tube 10 and an inner tube 11 concentrically supported within the former by perforated strouts 10'. A plurality of channels or apertures 12 are formed through the wall of tube 11 and are preferably spaced both axially and circumferentially. The inner and outer ends of each aperture 12 are covered by screen members 13 which serve to retain within the aperture a confined mass or bed of finely divided particles 14 of an oxygen transfer agent. As indicated above, such oxygen transfer agent may be metallic chromium, molybdenum or iron or an oxide of chromium, molybdenum or iron such as $Cr_2O_3$, $MoO_2$, $MoO_3$, $Fe_2O_3$ and $Fe_3O_4$, which is reducible by hydrogen to a lower oxide or metal at dehydrogenation temperature and also is oxidizable by oxygen to the original higher oxide at the same temperature. The oxygen transfer agent may be supported upon a porous particulated carrier such as alumina, silica, magnesia, alumina-silica, alumina-magnesia and the like. The inner surface 15 of tube 11 may be coated with a conventional dehydrogenation catalyst, or the entire volume of tube 11 may be filled with a particle-form supported dehydrogenation catalyst. Tube 10 is enclosed by a refractory furnace block 16 which in turn may be heated by conventional means such as electric coils embedded therein. Radiant heat transfer from block 16 to the assembly of tubes serves to maintain the reaction zone at the desired elevated temperature.

Hydrocarbon vapor feed is introduced into open end 18 of tube 11; the feed may be diluted with steam, nitrogen or other inert gas for partial pressure control in the usual manner. Dehydrogenation reaction product is withdrawn from the other end 19 of tube 11. A free oxygen containing gas is introduced to annular space 17; such oxygen containing gas may be pure oxygen, air, or a blend of oxygen with steam or nitrogen. The total pressure of the oxygen containing gas is maintained at about or slightly above the total pressure existing in tube 11; for example, the pressure differential may range from about 0.1 inch $H_2O$ to about 0.5 p.s.i., depending on the thickness and porosity of beds 14, so that the transport of oxygen into the beds is essentially diffusion controlled and does not exceed the rate of oxygen consumption by the oxygen transfer agent. In other words, the operation of the reactor is such that no free oxygen escapes into the dehydrogenation zone proper, and essentially no free hydrogen escapes into the free oxygen-containing atmosphere within annular space 17. Annular space 17 may be closed at one end to provide a dead ended volume of oxygen surrounding tube 11, or annular space 17 may be open at both ends, whereby a free flowing stream of oxygen may be passed through the annular space, enriched with additional oxygen, and recycled to the inlet end of the annular space. It is, of course, within the scope of the present invention to reverse the functions of the tubes whereby the outer annular zone serves as the dehydrogenation zone and air or other oxygen-containing gas is charged to the inner tube; with this latter construction, the walls of the annular zone may be coated with a suitable dehydrogenation catalyst or the annular zone may be filled with a solid dehydrogenation catalyst distended upon a porous support or carrier.

Figure 3:
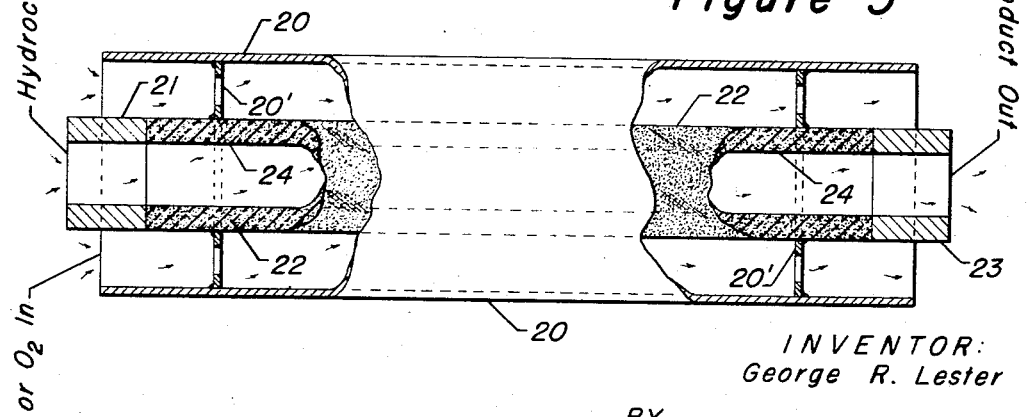
FIGURE 3 illustrates another embodiment of the tubular reactor in which the hydrogen transfer agent is fairly continuously dispersed in and along the wall of the inner tube, the same being constructed of a porous refractory material.

FIGURE 3 depicts another embodiment of the reactor which comprises an outer tube 20 and an inner tube 22 concentrically supported within tube 20 by perforated struts 20'. Tube 22 is constructed of a highly porous, self-supporting refractory or monolithic material such as porous or "thirsty" glass or sintered metal. Porous glasses are well known in the art and may be manufactured as set forth, for example, in U.S. Patent No. 2,106,744. A commercially available highly porous glass is Vycor 7930 manufactured by Corning Glass Works, Corning, N.Y. The pores of tube 22 are filled completely or partially with a suitable oxygen transfer agent (Cr, Mo, Fe, or oxides thereof) by impregnation. The ends of tube 22 are bonded to metal couplings 21, 23 for connection with external piping. The inner surface 24 of tube 22 is coated with a suitable dehydrogenation catalyst. Vaporous hydrocarbon feed is charged to tube 22, air or oxygen is fed to the annular space between the tubes, and olefinic product is removed from the other end of tube 22. As the dehydrogenation reaction tries to come to equilibrium, the hydrogen produced is converted to water by the oxide in the pores, and this hydrogen removal causes shift of equilibrium to produce more olefin and hydrogen. The oxide is regenerated by the air or oxygen flowing through the annular space, and the net reaction is diffusion of oxide ions through the oxide held in the pores of the porous glass.

The benefits afforded by the invention are further illustrated by the following specific examples. It is not intended, however, that the invention be limited to the particular reactants, catalysts or conditions specified therein.

*Example I.—Butane dehydrogenation*

A first tubular reactor, designated reactor A, is constructed as shown in FIGURE 3. The porous inner tube is formed of Vycor 7930, 1.5 inches I.D. x 12 inches long and wall thickness of 0.125 inch. The outer tube has an inside diameter of 2.5 inches. Prior to assembling the reactor, the inner tube is immersed in a ferric nitrate solution and then calcined for 2 hours at 1100° F. to provide 5% by weight of $Fe_2O_3$, based on tube weight, uniformly dispersed throughout the pores of the tube. A second reactor, designated reactor B, is identically constructed except that the porous inner tube is impregnated with ammonium dichromate solution and calcined to provide 5% by weight of $Cr_2O_3$ based on tube weight, uniformly dispersed throughout the pores of the tube. A third reactor, designated reactor C, is identically constructed except that the inner tube is constructed of a fluid-impervious, non-catalystic ceramic. Each of the three reactors is loaded with 300 cc. of 1/16 inch spherical dehydrogenation catalyst having the composition 5 $Cr_2O_3$–95 $Al_2O_3$. The reactors are installed in a thermostatically controlled muffle furnace. Gaseous butane is fed to the inner tube of each and air is passed through the annulus. The butane feed and air streams are preheated to reaction temperature before entering the reactor. Conditions and results for a 30 minute period of lined out operation are given in Table I below. All flows are gas volume corrected to standard conditions of temperature and pressure.

TABLE I

| | Reactor | | |
|---|---|---|---|
| | A | B | C |
| Oxygen Transfer Agent | $Fe_2O_3$ | $Cr_2O_3$ | None |
| Temperature, ° F | 450 | 450 | 450 |
| Inlet pressure, p.s.i.a | 14.5 | 14.5 | 14.5 |
| Feed rate, cc./min | 2,000 | 2,000 | 2,000 |
| Air rate, cc./min | 3,000 | 3,000 | 3,000 |
| Butane conversion, mol percent | 23.7 | 22.5 | 0 |
| Selectivity to Total n-butenes, percent | 96 | 95 | |

*Example II.—Butene dehydrogenation*

The three reactors of Example I are utilized with the following changes: each reactor is loaded with 200 cc. of a dehydrogenation catalyst having the composition 84 $Fe_2O_3$–4 $Cr_2O_3$–12 $K_2CO_3$; the feed is 97% 1-butene; means are provided for diluting the feed with 600° F. steam. Conditions and results for a 30 minute period of lined out operation are given in Table II below.

TABLE II

| | Reactor | | |
|---|---|---|---|
| | A | B | C |
| Oxygen Transfer Agent | $Fe_2O_3$ | $Cr_2O_3$ | None |
| Temperature, ° F | 600 | 600 | 600 |
| Inlet Pressure, p.s.i.a | 17.1 | 17.1 | 17.1 |
| Feed rate, cc./min | 1,500 | 1,500 | 1,500 |
| Steam rate, cc./min | 16,200 | 16,200 | 16,200 |
| Air rate, cc./min | 2,350 | 2,350 | 2,350 |
| Butene Conversion, mol percent | 22.6 | 21.4 | 0.5 |
| Selectivity to 1,3 $C_4H_6$, percent | 93 | 91 | 98 |

*Example III.—Ethylbenzene dehydrogenation*

A first tubular reactor, designated reactor D, is constructed as shown in FIGURE 1. The outer tube has an inside diameter of 2.5 inches. The perforated inner tube is formed of 316 stainless steel, 1.5 inches I.D. x 12 inches long and wall thickness of 0.125 inch, and is provided with 4 axial rows of holes, each row consisting of 10 evenly spaced 0.5 inch I.D. holes, the rows being spaced 90° apart. Each hole is filled with an oxygen transfer agent having the composition 15 $Fe_2O_3$–20 $MoO_2$–65 $Al_2O_3$ in the form of a compacted mass of particles having a diameter in the range of 300–600 microns. The ends of the holes are closed by fine stainless steel screens. A second tubular reactor, designated reactor E, is furnished with an imperforate stainless steel inner tube. Both reactors are loaded with 200 cc. of 1/16 inch spherical catalyst having the composition 90 $Fe_2O_3$–4 $Cr_2O_3$–6 $K_2CO_3$. The reactors are installed in a thermostatically controlled muffle furnace. Vaporized ethylbenzene, in admixture with diluent steam, is fed to the inner tube of each reactor, and air is passed through the annulus. The ethylbenzene feed, steam and air streams are preheated to reaction temperature before entering the reactor. Conditions and results for a 30 minute period of lined out operation are given in Table III below.

TABLE III

| | Reactor | |
|---|---|---|
| | D | E |
| Oxygen Transfer Agent | $Fe_2O_3$-$MoO_2$ | None |
| Temperature, ° F | 650 | 650 |
| Inlet Pressure, p.s.i.a | 19.2 | 19.5 |
| Feed rate, cc./min | 2 | 02 |
| Steam rate, cc./min | 22.5 | 222 |
| Air rate, cc./min | 150 | 15. |
| Ethylbenzene conversion, mol percent | 26.6 | 1.4 |
| Selectivity to styrene, percent | 95 | 90 |

*Example IV.—Dodecane dehydrogenation*

The two reactors of Example III are utilized with the following changes: each reactor is loaded with 200 cc. of 1/16 inch spherical catalyst having the composition 5 $Cr_2O_3$–95 $Al_2O_3$; the feed is 96% n-dodecane. Conditions and results for a 30 minute period of lined out operation are given in Table IV below.

TABLE IV

| | Reactor | |
|---|---|---|
| | D | E |
| Oxygen Transfer Agent | $Fe_2O_3$-$MoO_2$ | None |
| Temperature, ° F | 530 | 530 |
| Inlet Pressure, p.s.i.a | 15.1 | 15.0 |
| Feed rate, cc./min | 450 | 450 |
| Steam rate, cc./min | 2300 | 2300 |
| Air rate, cc./min | 700 | 708 |
| Dodecane conversion, mol percent | 24.2 | 3.1 |
| Selectivity to total n-dodecenes, percent | 82 | 84 |

As is evident from the foregoing examples, the present technique achieves substantially higher conversions and selectivities at a given temperature than is obtainable with ordinary catalytic dehydrogenation processes of the prior art and, more particularly, permits the use of substantially lower dehydrogenation temperatures to effect a commerically significant degree of conversion. Lower temperatures are especially advantageous in dehydrogenating the higher paraffins, such as the $C_7$–$C_{18}$ paraffins, to the corresponding mono-olefins since there is markedly reduced loss of product through competing reactions such as cracking and dehydrocyclization.

I claim as my invention:

1. Process for the low temperature dehydrogenation of a hydrocarbon feed to form a less saturated hydrocarbon of corresponding structure and free hydrogen, which comprises reacting the feed under dehydrogenation conditions including a temperature of about 200° F. to about 750° F.; maintaining the dehydrogenation reaction mixture in contact with one side of an oxygen transfer zone defined by a porous structure adapted to provide essentially diffusion controlled fluid transport therethrough and comprising a chemical oxygen transfer agent selected from the group consisting of chromium, molybdenum, iron and the oxides of these metals; maintaining an oxygen-containing gas in contact with the other side of said transfer zone; diffusing oxygen from said other side into the transfer zone toward said one side and oxidizing said transfer agent; simultaneously diffusing said free hydrogen from said one side into the transfer zone toward said other side and reducing said transfer agent and converting said hydrogen to $H_2O$, thereby establishing an oxygen concentration gradient across said transfer zone which decreases in a direction proceeding from said other side to said one side; and limiting the transport of oxygen through the transfer zone so that essentially no free oxygen escapes into the dehydrogenation reaction mixture.

2. Process of claim 1 wherein said oxygen transfer agent is an oxide of chromium.

3. Process of claim 1 wherein said oxygen transfer agent is an oxide of molybdenum.

4. Process of claim 1 wherein said oxygen transfer agent is an oxide of iron.

5. Process of claim 1 wherein said hydrocarbon feed is a paraffin containing 3 to 6 carbon atoms per molecule.

6. Process of claim 1 wherein said hydrocarbon feed is a paraffin containing 7 to 18 carbon atoms per molecule.

7. Process of claim 1 wherein said hydrocarbon feed is a monoolefin containing 3 to 6 carbon atoms per molecule.

8. Process of claim 1 wherein said hydrocarbon feed is an alkylbenzene in which the alkyl group contains 2 to 6 carbon atoms.

References Cited

UNITED STATES PATENTS

| | | | |
|---|---|---|---|
| 2,387,731 | 10/1945 | Allen | 260—680 |
| 2,431,632 | 11/1947 | Brandt | 48—224 X |
| 2,813,114 | 11/1957 | Hughes et al. | 260—683.3 X |

FOREIGN PATENTS 1,161,257  1/1964  Germany.

PAUL M. COUGHLAN, Jr., *Primary Examiner.*

DELBERT E. GANTZ, *Examiner.*

C. R. DAVIS, *Assistant Examiner.*